Sept. 4, 1934.     N. TRBOJEVICH     1,972,544
METHOD OF AND MACHINE FOR GENERATING GEARS
Filed Sept. 24, 1928
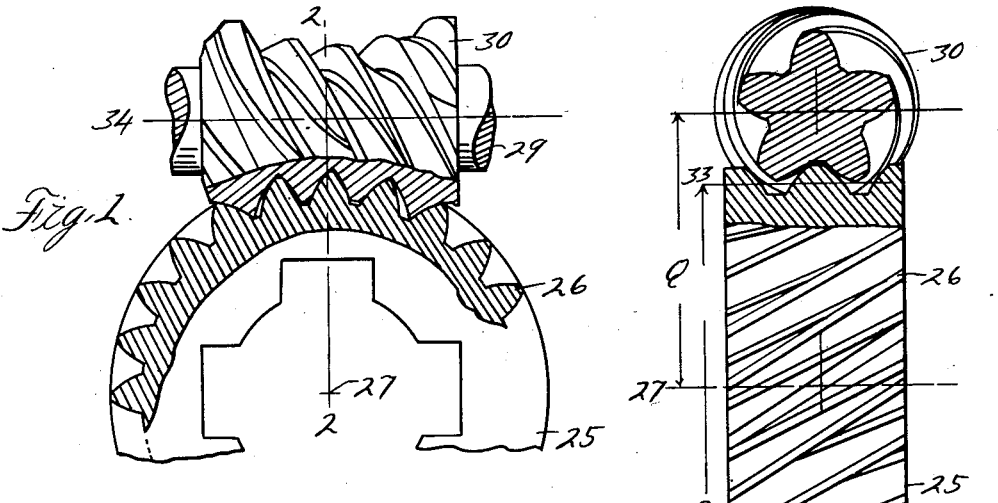
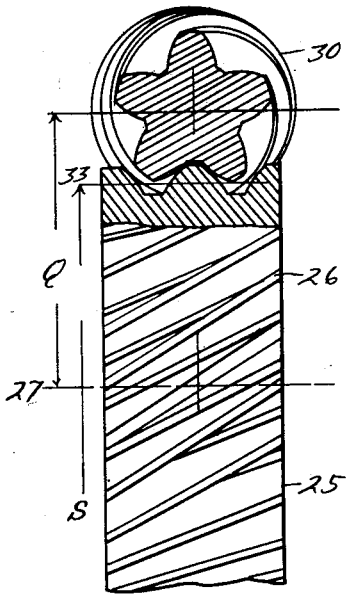
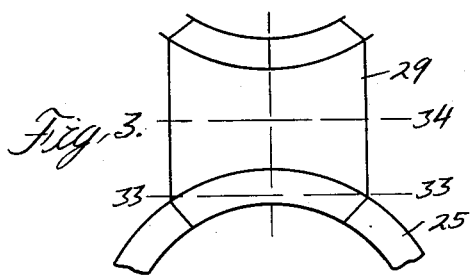
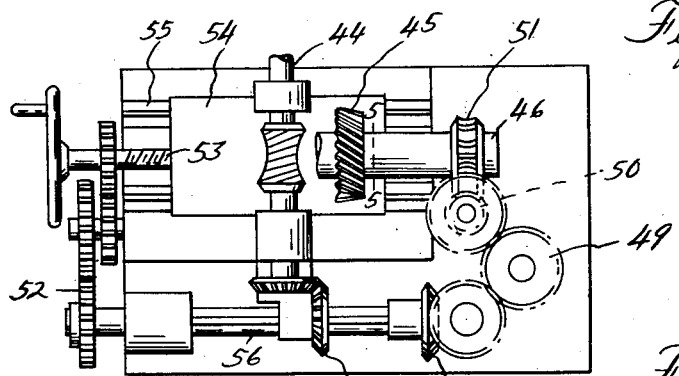
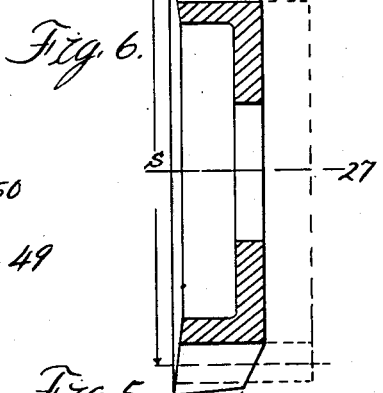
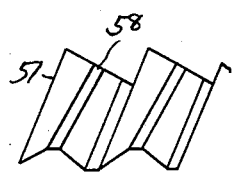
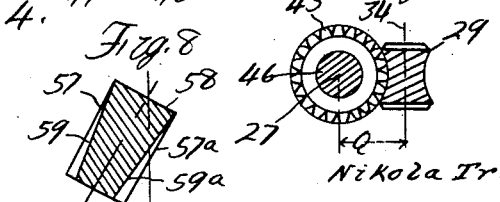
Inventor
Nikola Trbojevich Patented Sept. 4, 1934

1,972,544

UNITED STATES PATENT OFFICE 1,972,544

METHOD OF AND MACHINE FOR GENERATING GEARS

Nikola Trbojevich, Highland Park, Mich.

Application September 24, 1928, Serial No. 308,024

12 Claims. (Cl. 90—4)

The invention relates to a novel method of and apparatus for generating worms of the hour-glass or globoid type described in my co-pending application, Serial No. 277,693 filed May 14, 1928, of which this application is a division. The earlier filed application has claims on the gearing, whereas the present application deals with the method of generation and the machine for producing the gears.

My improved worm gearing consists of a worm member of the globoid type and a cooperating gear member in the form of a cylindrical helical gear. The object of the invention is to devise a method of generating the globoid worm smoothly and without mutilation. Another object is to simplify the process and to reduce the tool cost. Still another object is to employ a cutter which will not change its tooth form and pitch diameter after repeated sharpenings. Another object is to employ a cutter having convexly curved cutting edges conforming to a series of involutes drawn from a base circle whereby the normal pitch, the pressure angle and the base diameter of the cutter will not change after repeated sharpenings, thus enabling the operator to produce worms of similar characteristics and constant thickness of tooth regardless of the variations in the outside diameter and thickness of tooth of the cutter incidental to said sharpenings.

In the drawing

Figure 1 is the elevation of my improved worm and gear;

Figure 2 is the plane section 2—2 of Figure 1;

Figure 3 is a diagram showing the location of the pitch plane of the drive;

Figure 4 is the plan view of the hobbing machine in which my method may be practised;

Figure 5 is a detail view of Figure 4 taken in the plane 5—5;

Figure 6 is the cross section of the improved Fellows cutter adapted to this method;

Figure 7 shows the method of forming the cutting facets in front of each cutting tooth of the cutter shown in Figure 6;

Figure 8 is the cross section 8—8 of a single tooth of the cutter shown in Figure 6, showing the method of relieving the cutting teeth.

Figures 1 and 2 show the new worm drive in two projections. The driven member 25 is a cylindrical gear having a plurality of preferably involute helical teeth 26. The driving member is an hour-glass worm having its threads 30 so formed that they will engage the corresponding helical teeth 26 of the mating gear 25 at every instant with a line contact as more fully explained in my aforementioned co-pending application for patent.

Figure 3 diagrammatically shows the location of the pitch plane 33 of the new drive. Said pitch plane is so selected that in conjunction with the length of the worm and the pressure angle employed the worm teeth will not become undercut, neither will they exhibit in their formation a phenomenon which is sometimes termed as a "feather edge". This feature is also more fully explained in the above mentioned application.

The method of generating the teeth 30 of the worm 29 will now be described. Figure 4 represents a plan view of a common gear hobbing machine in which this process may be performed.

The worm 29 is mounted upon the hob arbor 44 where ordinarily the hob is, and the cutter 45 is placed upon the work arbor 46, i. e. just the opposite of the conventional practice in gear cutting. When the arbor 44 is rotated, the rotation from the worm 29 is transmitted to the cutter 45 in a timed relation through the bevel gears 47 and 48, the index change gears 49, the worm 50 and the worm gear 51. At the same time, the feed mechanism is actuated also in a timed relation through the feed gears 52 and the feed screw 53, said feed screw engaging a corresponding nut in the slide 54, thus causing the same to move slowly over the ways 55 toward the cutter 45. The shaft 56 carrying the bevel gear 47 is splined in order to permit an uninterrupted rotation of the parts at all times and positions.

The axis 27 of the cutter 45 is situated above the axis 34 of the worm at the exact center distance Q required for the finishing cut, as shown in detail in Figure 5.

The cutter 45 is similar in dimensions to the helical gear 25 which it is desired to imitate in action. The hobbing machine shown in Figure 4 is so geared up by means of the change gears 49 and 52 that the cutter 45 will move relative to the blank 29 in an exactly predetermined helical path identical with the exact lead of helix of the gear 25. By this means the cutting edges 58 of the cutter 45 will remove from the worm 29 no more and no less metal than what is exactly required to bring the said worm 29 in a complete line contact with the mating gear 25. Worms finished by this method exhibit when rotated together with their mating gear at the predetermined center distance Q a full "bearing" from end to end and from tops to the roots of their threads. This is as it should be, because as it is readily seen, the cutter 45 cannot possibly touch during the process of generation any point or points of the tooth surfaces which are not subsequently touched by the gear, and vice versa, it will touch and finish the aggregate of all such points of contact.

The method of constructing the cutter 45 will best be understood from Figures 6, 7 and 8. The pitch diameter S must be the same as in the corresponding gear 25 shown in dotted lines, Figure 6, while the outside diameter 60 of the cutter is made somewhat larger than the outside diameter 61 of the gear in order to allow for the bottom clearance and the loss of diameter after each sharpening due to the relief 62 on tops of teeth as it will be understood. The cutting facets 58 are situated in the fronts of cutter teeth, Figure 7, preferably at right angles to the pitch helix as is customary in this type of cutters.

Figure 8 shows the method of relieving the cutter teeth. The body of any single cutter tooth before relieving is bounded by the two parallel helixes 57 and 57a, and the facet 58, the two helixes exactly corresponding to the helixes of the mating gear 25. The cutting relief is obtained by removing the metal by means of a form tool along the two converging helixes 59 and 59a, respectively, one of them possessing a longer lead and the other a shorter lead than the two parallel helixes 57 and 57a. It is seen that by employing this method of relieving the cutting teeth, that is, by the method of side clearance, the cutting edges of the cutter will always remain equi-distant from the axis 27 after any number of sharpenings and thus, will produce correct tooth surfaces in the worm 29 during the active life of such a cutter. The only drawback to this method is that after each sharpening the thickness of the cutting teeth in the cutter will be slightly reduced, which fact, however, is of no serious consequence inasmuch as this type of gearing when applied to rear axles of automobiles ordinarily operates with a considerable backlash, anyway from about .015 to .025 of an inch.

In the preferred modification of this invention the tooth curves both of the gear 25 and the cutter 45 are involutes of a circle. The advantage of the involute system as applied to this process of generating globoid worms lies in the fact that the base diameter of the cutter remains unchanged through repeated sharpenings providing the teeth have been backed off with side relief as above described. The globoid worm 29 being generated by an involute cutter is itself an involute gear and bears a certain similarity to a segment of an internal gear.

Thus, I have discovered that the worm so generated will correctly mesh with a series of smaller involute gears providing all such gears have fewer teeth (at least one tooth less) than the generating cutter and their teeth have the same circular pitch, normal pitch, pressure angle and helical angle as the said cutter. This is new in globoid gearing. I have also discovered that a side relieved cutter will not change its circular pitch, normal pitch, etc., dimensions after sharpening, the only two dimensions that change being the outside diameter of the cutter and the thickness of tooth. Therefore, by my method of generating it is now possible to utilize the cutter through a series of repeated sharpenings and it is permissible to alter the center distance Q, Figure 5 to obtain any desired thickness of tooth in the worm 29 and yet all such worms will correctly mesh with any one of the smaller gears contained in the above named series. I have utilized this principle for the mass production of tight fitting steering gears as is more fully explained in my co-pending application, Serial No. 346,232, filed March 11, 1929, entitled "Steering gear."

What I claim as my invention is:

1. A method of generating globoid worms consisting in selecting a pinion-shaped cutter having a plurality of helical cutting teeth arranged about its circumference, each of said teeth having a cutting facet formed at its front end, said cutter being of a predetermined diameter, number of teeth and tooth contour conforming to the curvature of the globoid worm to be produced, in rotating the said cutter and the blank at a predetermined center distance, angle of incidence and the ratio of rotation in such a manner that both the angular and the peripheral velocities of the cutter are correspondingly less than those of the worm and in imparting to the cutter a relative feed movement transversely to the axis of blank until all points of possible contact in the blank are finished.

2. A method of generating globoid worms of the involute type which consists in first selecting a pinion-shaped cutter having a row of helical cutting teeth arranged about its circumference, each of said teeth having a tooth contour of an involute curve drawn from a predetermined base circle, each having a cutting facet formed at its front end, having its top conically relieved and its flanks side relieved along two converging helixes in order to maintain a constant base circle after repeated sharpenings, in rotating the said cutter and the blank at a predetermined center distance, angle of incidence and the ratio of rotation in such a manner that both the angular and the peripheral velocities of the cutter are correspondingly less than those of the worm and in imparting to the cutter a relative feed movement along its axis transversely to the axis of the blank.

3. A method of generating globoid worms of the involute type which consists in first selecting a pinion-shaped cutter having a row of helical cutting teeth having a tooth contour of an involute curve drawn from a predetermined base circle, each having a cutting facet formed at its front end, having its top conically relieved and its flanks side relieved along two converging helixes in order to maintain a constant base circle after repeated sharpenings, in rotating the said cutter and the blank in a timed relation in such a manner that both the angular and the peripheral velocities of the cutter are correspondingly less than those of the worm and in imparting to the cutter a relative feed movement towards the axis of the blank until the threads are completely finished.

4. A method of generating globoid worms consisting in selecting a pinion-shaped cutter having a plurality of circumferentially arranged teeth, each provided with a cutting edge at the front end thereof, said cutter being of a predetermined diameter, number of teeth and tooth contour conforming to the curvature of the globoid worm to be produced, in rotating the said cutter and the blank at a predetermined center distance, angle of incidence and ratio of rotation in such a manner that both the angular and the peripheral velocities of the cutter are correspondingly less than those of the worm and in imparting to the cutter a relative feed movement transversely to the blank in the direction of the cutter axis until all points of possible contact are finished.

5. A method of manufacturing globoid worms to have a constant throat diameter, pressure angle, normal pitch and normal thickness of tooth regardless of the variations, within a range, in the diameter and thickness of teeth of the generating cutter, in which a pinion-shaped cutter is selected which has a plurality of circumferentially arranged teeth, each provided with a cutting edge at the front end thereof, said cutting edges being further convexly curved and substantially conforming with an involute drawn from a predetermined base circle, in which the flanks of the cutting teeth are side-relieved and the tops conically relieved in such a manner that after sharpening the diameter and thickness of teeth will be diminished but the base circle will remain constant, in which the cutter and the work are rotated in a timed relation in such a manner that both the angular and the peripheral velocities of the cutter are correspondingly less than those of the worm and the center distance from the work is adjusted to obtain the desired normal thickness in the worm teeth, thus producing worms capable of meshing without backlash with a series of gears all having a constant pressure angle, pitch and thickness of tooth, but less number of teeth than the generating cutter.

6. In an apparatus for generatively cutting a worm, a tool spindle, a tool on the tool spindle in general of gear-form and having cutting edges at the longitudinal ends of its teeth, a work spindle adapted to support a worm blank, the tool and work spindles being relatively positioned so that their axes of rotation lie at an angle to each other in spaced parallel planes, means for rotating the work and tool spindles at a predetermined relative velocity ratio in such a manner that both the angular and the peripheral velocities of the cutter are correspondingly less than those of the worm, means for setting up relative lead movement between the tool and the blank in the direction of the tool spindle axis, the distance apart of the said planes being such that said lead movement causes the cutter teeth to enter and pass through the blank at one side of the work spindle axis and the said velocity ratio being such as to cause the cut made by the teeth to be a helical groove in the surface of the blank.

7. In an apparatus for generatively cutting a worm, a tool spindle, a tool on the tool spindle in general of gear-form and having cutting edges at the longitudinal ends of its teeth, a work spindle adapted to support a worm blank, the tool and work spindles being relatively positioned so that their axes of rotation lie at an angle to each other in spaced parallel planes, means for rotating the work and tool spindles at a predetermined relative velocity ratio in such a manner that both the angular and the peripheral velocities of the cutter are correspondingly less than those of the worm, means for setting up relative lead movement between the tool and the blank in the direction of the tool spindle axis to cause the tool teeth to engage the blank and cut worm teeth thereon.

8. In an apparatus for generatively cutting a worm, a tool spindle, a tool on a tool spindle in general of helical gear-form and having cutting edges at the longitudinal ends of its teeth, a work spindle adapted to support a worm blank, the tool and work spindles being relatively positioned so that their axes of rotation lie at an angle of 90° to each other in spaced parallel planes, means for rotating the work and tool spindles at a predetermined velocity ratio in such a manner that both the angular and the peripheral velocities of the cutter are correspondingly less than those of the worm, means for setting up relative lead movement between the tool and the blank in the direction of the tool spindle axis to cause the tool teeth to enter and pass through the peripheral surface of the blank and the said velocity ratio being such that the said lead movement causes the cutter teeth to cut a helical groove in the surface of the blank.

9. The method of generatively cutting a worm of the enveloping type which includes rotating a worm blank about its axis, simultaneously rotating a cutting tool of gear-form about its axis at a predetermined velocity ratio to that of the blank in such a manner that both the angular and the peripheral velocities of the cutter are correspondingly less than those of the worm, and setting up relative lead movement between the tool and the blank in the direction of the tool axis, causing the cutter teeth to enter and pass through the peripheral surface of the blank at one side so that the tool teeth correspond to an imaginary gear in mesh with the worm to be cut.

10. In an apparatus for generatively cutting a worm, a tool spindle, a tool on said spindle having the general shape of an external gear adapted to mesh with the worm to be cut, and having cutting edges at the ends of its teeth, a work spindle for supporting the worm blank, means for rotating both spindles in predetermined relation in such a manner that both the angular and the peripheral velocities of the cutter are correspondingly less than those of the worm, and means for advancing one of said spindles toward the other also in a predetermined relation to their rotative movements.

11. A hobbing machine adapted to generate at one operation a worm of the enveloping type by mounting on the work spindle a cutter in general of gear-form, the teeth of which have cutting edges at their longitudinal ends, by adjusting the spaced distance of the work spindle axis and tool spindle axis and selecting a velocity ratio of rotation for the respective spindles in such a manner that both the angular and the peripheral velocities of the cutter are correspondingly less than those of the worm to cause the lead movement of the work spindle and to cause the cutter on the work spindle to enter and pass through the peripheral surface of the blank on the tool spindle and generate a helical groove therein.

12. A method of generating globoid worms which consists in selecting a gear-like cutter having cutting edges formed at the longitudinal ends of teeth, said teeth being greater in number than the teeth in the worm to be cut and inclined relative to the cutter axis at an angle of less than 45°, in rotating the blank and the cutter in a timed relation in such a manner that both the angular and peripheral velocities of the cutter are correspondingly less than those of the worm and in translating the cutter tangentially across the worm while maintaining a substantially constant least distance between the two axes.

NIKOLA TRBOJEVICH.